United States Patent [19]

Hubbs et al.

[11] Patent Number: 5,321,118

[45] Date of Patent: Jun. 14, 1994

[54] 1-ACETOACETAMIDO-2,3-PROPANE DIOL MONOMER AND POLYESTERS PREPARED THEREFROM

[75] Inventors: John C. Hubbs; Robert J. Clemens, both of Kingsport, Tenn.

[73] Assignee: Eastman Chemical Company, Kingsport, Tenn.

[21] Appl. No.: 130,040

[22] Filed: Sep. 30, 1993

[51] Int. Cl.$^5$ ............................................. C08G 69/44
[52] U.S. Cl. ............................... 528/291; 528/271; 528/272; 528/296; 528/298; 528/299; 528/300; 528/307; 528/308; 528/308.6
[58] Field of Search ............... 528/272, 291, 296, 298, 528/299, 300, 307, 308, 308.6, 271; 564/224

[56] References Cited

U.S. PATENT DOCUMENTS

| | | |
|---|---|---|
| 3,313,777 | 4/1967 | Elam et al. . |
| 3,494,882 | 2/1970 | Andrews . |
| 3,549,577 | 12/1970 | Stromberg . |
| 3,666,698 | 5/1972 | Harris et al. . |
| 3,699,066 | 10/1972 | Hunsucker ...................... 523/402 |
| 3,772,405 | 11/1973 | Hamb . |
| 4,263,364 | 4/1981 | Seymour et al. ................. 428/287 |
| 4,585,854 | 4/1986 | Tung et al. ...................... 528/295 |
| 5,003,041 | 3/1991 | Morris et al. ..................... 525/444 |
| 5,011,877 | 4/1991 | Morris et al. ..................... 524/115 |
| 5,017,649 | 5/1991 | Clemens .......................... 525/59 |
| 5,037,946 | 8/1991 | Morris et al. ..................... 528/272 |
| 5,057,595 | 10/1991 | Morris et al. ..................... 528/272 |
| 5,064,925 | 11/1991 | Hannaby ......................... 528/44 |
| 5,066,824 | 11/1991 | Mafoti et al. .................... 560/44 |
| 5,221,719 | 6/1993 | Morris et al. ..................... 525/444 |
| 5,237,038 | 8/1993 | Morris et al. ..................... 528/194 |

Primary Examiner—Samuel A. Acquah
Attorney, Agent, or Firm—Mark A. Montgomery

[57] ABSTRACT

Disclosed is a novel monomer composition and its preparation that is useful in the production of polyesters. This novel monomer composition is 1-acetoacetamido-2,3-propane diol and can be used in the preparation of polyesters in combination with a dicarboxylic acid.

7 Claims, No Drawings

1-ACETOACETAMIDO-2,3-PROPANE DIOL MONOMER AND POLYESTERS PREPARED THEREFROM

FIELD OF THE INVENTION

The present invention concerns a novel monomer composition that is useful in the preparation of polyesters. This novel monomer is 1-acetoacetamido-2,3-propane diol and can be used in the preparation of polyesters in combination with a dicarboxylic acid or ester thereof.

BACKGROUND OF THE INVENTION

Polyesters of many different types have been used for many years in various applications such as molded articles, fibers, and films. Polyesters that are useful in industrial applications have a wide variety of properties but not all polyesters can be used in all applications. Each new polyester is useful for at least one application and then, if its cost is low, it is substituted for existing polyesters in that application. Some new polyesters have such unusual properties that their existence creates a useful application.

U.S. Pat. No. 4,263,364 discloses polyesters of polyethylene terephthalate and polyesters of terephthalic acid, 1,4-cyclohexanedimethanol and ethylene glycol. These polyesters have excellent impact strength.

U.S. Pat. Nos. 5,037,946, 5,057,595, and 5,011,877 disclose polyesters having high tensile strength.

U.S. Pat. Nos. 5,003,041 and 5,221,719 disclose polyester blends having good gas barrier properties.

U.S. Pat. No. 5,237,038 discloses polyesters having good properties such as good flexibility and high heat resistance.

U.S. Pat. Nos. 3,313,777, 3,772,405, 4,263,364 and 4,585,854 generally disclose polyesters that can contain 2,2,4,4-tetramethyl-1,3-cyclobutanediol and have various properties.

A particularly, useful class of polyesters for coatings applications are alkyd resins. Typically alkyd resins are low to moderate molecular weight polyesters which contain reactive functionality to permit crosslinking of the polyester into a high molecular weight film. Thus alkyd resins can be applied to a surface prior to the final crosslinking step. Examples of different alkyd resin systems are disclosed in U.S. Pat. Nos. 3,666,698, 3,699,066, 3,549,577 and 3,494,882.

Research is currently being conducted to develop new polyesters for new applications and new polyesters for existing applications that are less costly and/or have improved properties. This research is focused on combinations of existing monomers (combinations of glycols and polycarboxylic acids) and on the discovery of new monomers for incorporation into polyesters.

In light of the above, it would be very desirable to be able to produce a novel monomer in order to produce novel polyesters from the novel monomer in combinations with other monomers.

Of particular interest would be novel monomers which provide for new and low temperature means for crosslinking in alkyd resins.

SUMMARY OF THE INVENTION

The polyester monomer composition according to the present invention comprises 1-acetoacetamido-2,3-propane diol.

Another aspect of the present invention entails the process for producing 1-acetoacetamido-2,3-propane diol that comprises; reacting at a temperature of about 0 to 180° C. 1-amino-2,3-propane diol and an acetoacetate ester, or acetoacetate precursor in to produce 1-acetoacetamido-2,3-propane diol.

A further aspect of the present invention entails the polyester produced from the novel monomer of the present invention that comprises:

(a) a glycol component comprising repeating units of about 5 to 100 mol% 1-acetoacetamido-2,3-propane diol; and (b) an acid component comprising repeating units of at least one dicarboxylic acid, wherein the total mol% of glycol component and acid component are each 100 mol%.

DETAILED DESCRIPTION OF THE INVENTION

The applicants have unexpectedly discovered a novel composition, 1-acetoacetamido-2,3-propane diol, that is a monomer useful in the formation of polyesters. The composition according to the present invention preferably comprises 95 weight percent pure 1-acetoacetamido-2,3-propane diol, with a purity of about 99 weight percent being more preferred.

The process for producing 1-acetoacetamido-2,3-propane diol comprises; reacting at a temperature of about 0 to 180° C. 1-amino-2,3-propane diol and an acetoacetate ester, or acetoacetate precursor to produce 1-acetoacetamido-2,3-propane diol.

Examples of suitable acetoacetate esters or acetoacetate precursors include tert butylacetoacetate, methylacetoacetate, ethylacetoacetate, diketene, and 2,2,6-trimethyl-4H-1,3-dioxin-4-one (the diketene acetone adduct). For economic reasons diketene is the most preferred reagent.

The process of the present invention is preferably conducted in water but is optionally conducted in an organic solvent. Specific examples of suitable organic solvents include methanol, ethanol, methyl acetoacetate, ethyl acetoacetate, ethyl acetate, butyl acetate, and mixtures thereof.

The reaction product can be purified by aqueous extraction such as dissolving the product in ethyl acetate and extracting with distilled water. Alternatively, and sometimes more advantageously, 1-acetoacetamido-2,3-propane diol can be purified by crystallization. While a variety of organic solvents can be used to crystallize 1-acetoacetamido-2,3-propane diol, the most preferred solvent for recrystallization of this novel monomer is a mixture of ethyl acetate and ethanol.

The specific preparatory scheme for the compound of the present invention is illustrated in Scheme 1.

Scheme 1

Diketene is reacted at a temperature of about 25 to 35° C. with 1-amino-2,3-propane diol in an aqueous solution to produce 1-acetoacetamido-2,3-propane diol, as illustrated below:

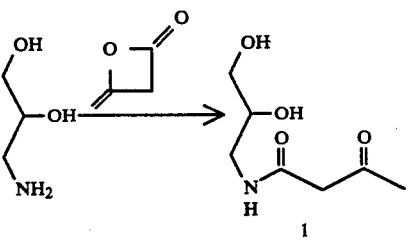

The polyester according to the present invention comprises:
(a) a glycol component comprising repeating units of about 5 to 100 mol% 1-acetoacetamido-2,3-propane diol; and
(b) an acid component comprising repeating units of at least one dicarboxylic acid, dicarboxylic acid ester, or dicarboxylic acid halide, wherein the total mol% of glycol component and acid component are each 100 mol%.

Preferred dicarboxylic acids and derivatives of dicarboxylic acids used in the preparation of the polyester according to the present invention are selected from dicarboxylic acids, or esters or acid halides derived therefrom of the group consisting of linear aliphatic diacids, terephthalic acid, isophthalic acid, 4,4'-biphenyldicarboxylic acid, 1,5-naphthalenedicarboxylic acid, 2,6-naphthalene-dicarboxylic acid, 2,7-naphthalenedicarboxylic acid and trans-4,4'-stilbenedicarboxylic acid and the esters thereof.

Preferred linear aliphatic diacids include sebacic acid, adipic acid, fumaric acid, maleic acid, and malonic acids. More preferred linear aliphatic diacids are adipic and sebacic acid. Due to their higher reactivity, it is more preferred that diesters, or diacid halides, which are derived from the linear aliphatic diacids, be utilized. Preferred linear aliphatic diesters include dimethyladipate and dimethylsebacate. Preferred linear aliphatic diacid halides include adipoyldichloride and sebacoyl dichloride.

The 1-acetoacetamido-2,3-propane diol can be used as the only glycol in a homopolyester or in combination with other glycols to form a copolyester. When a combination of glycols is used it is preferred that the glycol component be about 10 to 90 mol% 1-acetoacetamido-2,3-propane diol and about 90 to 10 mol% of at least one other glycol selected from the group consisting of aliphatic glycols having 3 to 20 carbon atoms and ethylene glycol. Suitable examples of other glycols include 1,2-propanediol, 1,3-propanediol, neopentyl glycol, 1,5-pentanediol, 1,6-hexanediol, cis-1,4-cyclohexanedimethanol, trans-1,4-cyclohexane-dimethanol, p-xylene glycol, polyethylene glycols, polytetramethylene glycols, 2,2,4,4-tetramethyl-1,3-cyclobutanediol, ethylene glycol, and mixtures thereof.

The preferred process for producing a polyester according to the present invention comprises contacting a mixture of glycol (a) and dicarboxylic acid halide (b) in the presence of a basic catalyst at a temperature of about 0 to 100° C. for a time to sufficiently react a significant portion of the 1-acetoacetamido-2,3-propane diol.

The preferred polyesters of the process of the present invention are low to medium molecular weight polyesters for use as alkyd resins. By use of the novel glycol monomer, 1-acetoacetamido-2,3-propane diol, the alkyd resin thereby obtained contains the reactive functionality of the acetoacetamide. A variety of methods are known to crosslink the acetoacetamide unit contained within the alkyd resin. Thus, acetoacetates can be reacted with amines and polyisocyanates (U.S. Pat. Nos. 5,066,824, and 5,064,925), polyacrylates, a variety of other electrophiles as well as polyamines. The use of acetoacetates to form crosslinked films has been extensively described by Clemens in U.S. Pat. No. 5,017,649 which is incorporated herein by reference in its entirety. The degree of functionality required in the electrophile or polyamine for effective crosslinking will of course depend on the amount of acetoacetate incorporated into the polyester alkyd resin. Generally a reactive functionality of at least two is desired in the electrophile or polyamine in order to effectively crosslink the polyester alkyd resin.

The following examples are to illustrate the present invention but should not be interpreted as a limitation thereon.

Examples

Experimental

Proton and carbon nuclear magnetic resonance (NMR) spectra were recorded on a Varian Gemini 300 NMR instrument operating at 300 MHz in proton mode and 75 MHz in carbon mode. Spectra were plotted using Varian version 6.3A software. All spectra are referenced to TMS at 0 ppm unless otherwise noted. For the proton NMR spectra of acetoacetates, the ratio of the acetoacetate methyl peak(s) at ca. 2.2 to 2.3ppm to the methyl peak(s) at ca. 1.9 to 2ppm (enolic methyl) has been found to provide a sensitive measurement for the percent enol content in solutions of acetoacetates. Unless otherwise noted, where percent enol composition is indicated, the NMR tube containing the solution of acetoacetate in the indicated solvent has been allowed to equilibrate at room temperature for a minimum of 24 hours. For proton spectra, a pulse delay of 10 seconds was utilized to assure accurate integration. Proton NMR spectra were typically run at a concentration of 5 to 50 mg experimental compound per gram of solution. Proton and carbon coupling constants were measured directly from line spacings. Thus, in the proton NMR for ABX spin systems the reported $J_{ax}$ and $J_{bx}$ may be slightly in error When $v_a-v_b/J_{ab}$ approaches 2. Carbon NMR spectra were typically run at a concentration of 50 mg per gram of solution. Reported chemical shifts were obtained from fully proton decoupled spectra. For the carbon spectra of single isomers (not mixtures of diastereomers) both multiplicities and carbon proton coupling constants are reported and were obtained by turning the decoupler off prior to data acquisition. Multiplicities for large one bond couplings (>100Hz) are reported in capital letters while multiplicities for small long range couplings are reported in lower case letters. Coupling constants are reported as measured. The accuracy of reported coupling constants is assumed to be no less than three times the digital resolution. The line width of TMS at half height (resolution enhanced) is reported for all cases in which the line width exceeded six times the digital resolution.

Infrared spectra were recorded on an Nicolet 5DX Spectrophotometer and major peak minima are reported in reciprocal centimeters (cm−1). This instrument is capable of typical resolutions of less than 4 reciprocal centimeters. Infrared spectra were recorded from films (for oils) or KBr pellets for crystalline materials.

Mass spectra (MS) were obtained using a VG Analytical Ltd. Model ZAB-1F Mass Spectrometer in EI (electron impact), fast atom bombardment (FAB, Xenon gas) or FD (field description) mode. Gas chromatography-mass spectroscopy (GCMS) and accurate mass measurements (exact mass) were conducted using a VG 70-SEQ instrument equipped with a 30 meter DB5 capillary column (J and W Scientific) using helium carrier gas.

Trace metal analyses were performed by Atomic Absorption (Na) or by ICP (inductively coupled plasma for Fe, Al or Ni) on a Perkin Elmer ICP/6000 instrument. Elemental Analyses (C,H,N) were performed on a Carlo Erba Model 1106 Elemental Analyzer.

Example 1: Preparation of 1-acetoacetamido-2,3-propane diol

Diketene (555 ml, 7.30 mole) was slowly added to a solution of 1-amino-2,3-propane diol (Aldrich lot no. 15F3513, 666 g, 7.31 mole) in water (1360 g). Throughout the course of the diketene addition (5 hours), the reaction temperature was monitored and maintained between 25° and 35° C. through the judicious use of a dry-ice/ethyl acetate cooling bath. The resulting light yellow reaction mixture was left to stir at room temperature for approximately 44 hours before concentration in vacuuo. Proton NMR of the crude reaction mixture suggested the presence of a single product in high purity (1.263 kg, 99% of theory). This crude reaction product was crystallized from a heated (to 65° C.) solution of absolute ethanol (1L) and ethyl acetate (4L). The resulting crystals which formed on cooling (25° C., overnight) were isolated and dried by suction filtration (1002.7 g, 5.72 mole, 78%). A portion of these crystals (754 g) was again recrystallized from hot ethanol(285 g)/ethyl acetate(2.5 L). The resulting crystals were filtered, washed with 13 wt% of ethanol in ethyl acetate (25° C., 1.1L) and suction dried (673.47 g, 89% weight recovery, 70% overall yield).

$^1$H NMR (DMSO, digital resolution=0.14 Hz, TMS at half height=0.45 Hz): (keto/enol ratio 92/8) keto form: 8.03 (NH, broad t, J~5), 4.77 (OH, d, J=4.9), 4.54 (OH, t, J=5.8), 3.6–3.42 (m, 1H), 3.36–3.18 (m, 3H), 3.33 (bs, 2H), 3.06–2.85 (m, 1H), 2.14 (t, J=0.4Hz at 0.07 Hz digital res, 3H). Enolic acetoacetyl resonances were observed at 14.1 (OH, bs), 7.87 (NH, bt, J~5), 5.02 (CH, bs), and at 1.81 (CH3, d, J=0.53).

$^{13}$C NMR (DMSO, digital resolution=0.129 Hz): keto form: 203.1 (S and apparent hextet, J=6.2), 166.3(Sm), 70.2(Tm, J=142), 63.5 (Dm, J=137), 51.1(Tq, J=129.0, 1.5), 42.1 (Tm, J=135.5), 29.9(Qt, J=127.5, 0.9). Enolic acetoacetyl resonances were also observed at 171.6, 170.8, 91.0 and 20.8.

mp.=70–71° C.
IR: 3292(br), 1711, 1637, 1561, 1332, 1114, 1096, 1056
FDMS: M=175
Elemental analysis:
Calc. for $C_7H_{13}NO_4$: C, 47.99; H, 7.48; N, 8.00
Found: C, 47.67; H, 7.71; N, 7.86

EXAMPLE 2 (Comparative)

This example illustrates the preparation of the polyester containing 100 mol% 1-acetoacetamido-2,3-propane diol and 100 mol% sebacic acid units.

Sebacoyl dichloride (approximately 0.15 mole) and 1-acetoacetamido-2,3-propane diol (approximately 0.1 mole) are added to a vigorously stirred solution of methylene chloride at 0° C. Triethylamine (approximately 0.20 mole) is then added while applying external (dry-ice/acetone) cooling such that the reaction temperature is maintained at 0° C. The reaction is then allowed to warm to room temperature and is left overnight at room temperature with vigorous stirring. A solution of methanol (1L) and triethylamine (approximately 0.2 mole) is then added at a rate such that the reaction temperature is maintained at between 25 and 35° C. This final treatment with methanol converts acid chloride end groups into methyl ester end groups. The product mixture is then analyzed by gel permeation chromatography to reveal that the polymer fraction contains a number average molecular weight of approximately 1000.

We claim:

1. A polyester monomer composition comprising 1-acetoacetamido-2,3-propane diol.

2. The composition according to claim 1 wherein the composition comprises 95 weight percent pure 1-acetoacetamido-2,3-propane diol.

3. The composition according to claim 2 wherein the composition comprises 99 weight percent pure 1-acetoacetamido-2,3-propane diol.

4. A polyester comprising:
   (a) a glycol component comprising repeating units of about 5 to 100 mol% 1-acetoacetamido-2,3-propane diol; and
   (b) an acid component comprising repeating units of at least one dicarboxylic acid, dicarboxylic acid ester, or dicarboxylic acid halide,
wherein the total mol% of glycol component and acid component are each 100 mol%.

5. The polyester according to claim 4 wherein said acid component is selected from dicarboxylic acids of the group consisting of terephthalic acid, isophthalic acid, 4,4'-biphenyldicarboxylic acid, 1,5-naphthalenedicarboxylic acid, 2,6-naphthalene- dicarboxylic acid, 2,7-naphthalenedicarboxylic acid, trans-4,4'-stilbenedicarboxylic acid, adipic acid, sebacic acid, the diacid halides and the esters thereof.

6. The polyester according to claim 4 wherein the glycol component is about 10 to 90 mol% 1-acetoacetamido-2,3-propane diol and about 90 to 10 mol% of at least one other glycol selected from the group consisting of aliphatic glycols having 3 to 20 carbon atoms and ethylene glycol.

7. The polyester according to claim 6 wherein said other glycol is selected from the group consisting of 1,2-propanediol, 1,3-propanediol, neopentyl glycol, 1,5-pentanediol, 1,6-hexanediol, cis-1,4-cyclohexanedimethanol, trans-1,4-cyclohexane-dimethanol, p-xylene glycol, polyethylene glycols, polytetramethylene glycols, 2,2,4,4-tetramethyl-1,3-cyclobutanediol, ethylene glycol, and mixtures thereof.

* * * * *